June 9, 1931.  E. L. MINER ET AL  1,809,058

TOPOGRAPHIC MECHANISM

Filed May 21, 1928

Inventors:
ERNEST L. MINER
CLARENCE M. LEATHERMAN

By Frank D. Gray
Attorney

Patented June 9, 1931

1,809,058

UNITED STATES PATENT OFFICE

ERNEST L. MINER AND CLARENCE M. LEATHERMAN, OF COLDWATER, MICHIGAN, ASSIGNORS TO COLDWATER INSTRUMENT WORKS, OF COLDWATER, MICHIGAN

TOPOGRAPHIC MECHANISM

Application filed May 21, 1928. Serial No. 279,281.

This invention relates to topographic mechanism, and especially to structure for platting stadia notes. Our mechanism includes the usual protractor, and vernier arc mounted for rotation about the axis of the protractor, the latter and a suitable arm for the vernier having a common vertical axis identical with a vertical stem having a sharp lower point intended to be positioned upon the transit point of the drafting board.

The parts of our instrument are held in desired position by means of a vertical standard having a relatively large base for resting upon the paper, and a connecting bar or rod having one end adjustably attached to the said stem and the other end secured to a stem in alinement with the vertical stem referred to above, but appreciably above the surface of the protractor. The vernier is held in vertical position by pivotal connection with the axial stem and having a base clamp designed to be detachably mounted upon a suitable rule having a flat surface, so that pivotal movement of the scale or rule about the vertical stem will rotate with it the vernier relative to the protractor, when the latter is fixed to the rod connected with the standard.

It is an object of our improved mechanism that it can be used close to the edge of the drafting board, since we can place the vertical standard at any position whose direction from the axis of the protractor forms any desired angle with the elongated scale carrying the vernier. It is a further object that our protractor and its vernier are sufficiently high from the paper to make platting easy. A still further object of our structure results from our use of a very open protractor structure serving to enable the draftsman to look through these openings in determining the result desired.

It is a special object of our device that the vernier of our instrument is carried on an arm which has a bearing entirely independent of other moving parts and is therefore, at constant relation to the protractor, as it may easily be fixed, thereby making setting of the scale very accurate. This is not true of former devices of this nature, so far as known to us.

We have described our invention in detail in the specification hereinafter presented, recited the patentable features in the appended claims, and illustrated the structure in the accompanying drawings, in which,—

Figure 1:
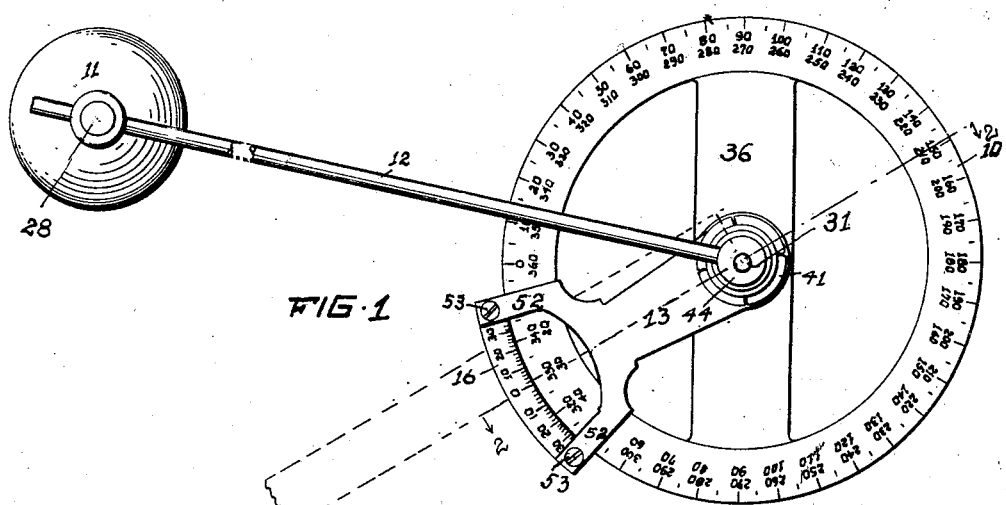
Figure 1 is a plan view of the mechanism, with the supporting scale shown in dotted lines only.
Figure 2:
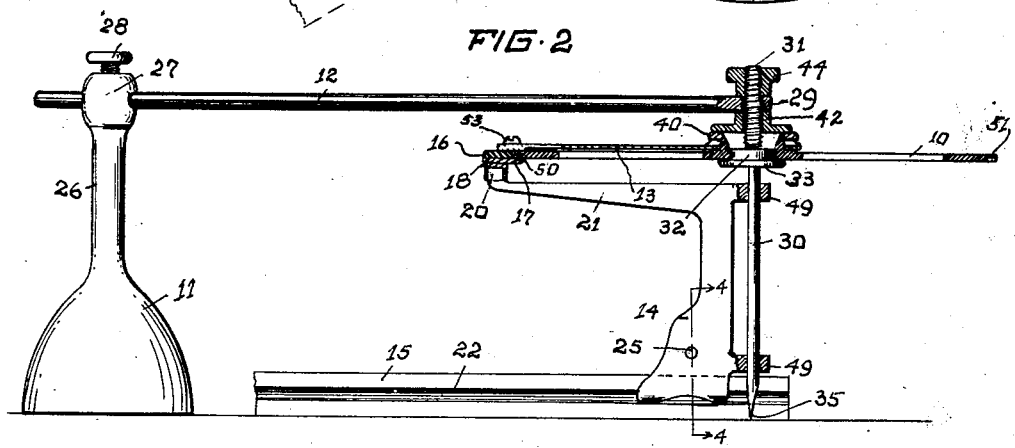
Figure 2 is a side elevation of the same, with certain parts shown in vertical section on the plane passing through the line indicated by 2—2 of Fig. 1.
Figure 5:
Figure 5 is a detail, perspective view of one of the clamp plates for the vernier.
Figure 4:
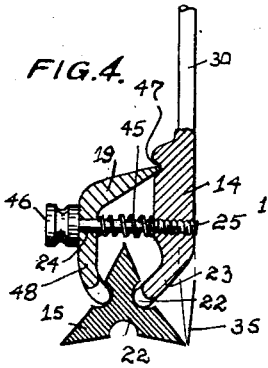
Figure 4 is a detail, vertical section of the clamping connection taken in the plane indicated by the line 4—4 of Fig. 2.
Figure 6:
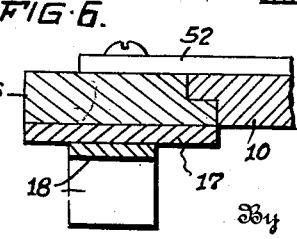
Figure 6 is a sectional detail view in a vertical plane of the vernier and related parts.

In the drawings we have illustrated our invention as a combination of an open protractor scale 10, with a base 11 of a vertical standard connected with the axle of the protractor by connecting rod 12, and a vernier scale 16 pivoted upon the protractor axle by the radial arm 13, the vernier scale mounted upon the foot 14 having clamping connection with the triangular scale 15 which is sufficiently elongated to permit desired adjustment of the clamp therealong.

While the vernier 16 is mounted for movement about the protractor 10 in connection with the clamping foot 14, such connection is not fixed but detachable. Such connection is made by securing an arc-shaped plate 17 to the under surface of the vernier 16, and fixedly securing an open yoke 18 upon the under surface of the plate 17 with the arms of the yoke directed downward to form a U-shaped seat for receiving therein detachably, the upright extension 20 at the extreme end of the arm 21 which is integral with the base 14.

The said base 14 is designed to be mounted upon the triangular scale 15 having the usual longitudinal grooves 22 in each face of the scale, the foot 14 having a reduced toe portion 23 adapted to fit into one of said grooves 22. The said base 14 is held in mounted position on the scale by the provision of a counterpart clamp member 19 of approximate L-shape in cross section, and having an aperture 24 in one arm to receive therein an attaching screw 25.

The entire instrument is mounted upon two standards connected adjustably in spaced relation by the rod 12. One of these standards 26 extending vertically from the base 11, has an enlargement 27 apertured to receive therein the plain end of the rod 12, and an intersecting, vertical aperture threaded to receive therein the screw 28 for securing the rod in desired position in the enlargement.

The opposite end of the rod 12 is provided with a loop or eye 29 for connection with the standard 30. The latter standard 30 is shown as formed of two sections in longitudinal alinement connected together as follows: The upper section of this standard comprises a threaded portion 31 integral with a cylindrical base portion 32 having an enlarged peripheral flange 33 at the lower surface of said base, and the lower face of the base provided with an axial opening 34 for receiving therein the upper end of the lower section of the standard 30 in a driving fit. The two sections will therefore serve as a practical continuous stem having a pointed lower end 35 to rest upon the usual drafting board and serve to hold the instrument in quite positive position, while the base 11 of the standard 26 will rest smoothly upon the board.

Figure 3:
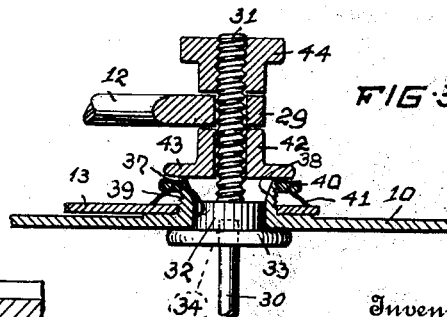
Figure 3 is a detail view of the bearing stem for the protractor, with certain parts shown in vertical section.

The protractor 10 is mounted upon a diametrical bar 36 having a central aperture 37 which is provided with an upwardly extended circular flange 38 which is threaded externally at 39, as shown clearly in Fig. 3. Above the surface of the bar 36 and about the flange 38 we have mounted a threaded nut 40 fitting the flange threads 39 for adjustment rotatably thereon, and further provided with lower extending peripheral, and flexible flange portions 41 to yieldingly engage the lower surface upon which it may be forced. As the nut 40 is rotated, the flange 41 will descend.

Above the extended flange 38 and the threaded nut 40, an annulus 42 having a peripheral flange 43 adjacent the one end of the annulus and of approximately the same radius as the nut 40, is loosely mounted upon the threaded end 31, and a nut 44 is threaded upon 31, so that rotation thereof may press down upon any intermediate portion between the nut and the annulus. The loop or eye 29 is intended to be mounted loosely upon the end 31 before applying the nut 44, so that this end of the bar 12 will be quite tightly held between the members above and below the bar.

The detachable mounting of the standard 30 upon the supporting rule 15 is made the more positive by providing the screw member 25 with an intermediate coil spring 45 which normally tends to separate the clamp member 19 away from the foot 14 of the arm 21, thereby normally permitting ready disengagement of the vernier support from the rule 15. Rotation of the screw 25 by the head piece 46 will tend to force the screw 25 through the vernier foot and tighten the upper point of the clamp 19 into the notch 47 of the foot 14, and tighten the lower portion 48 into a groove 22 of the rule opposite to the groove in which the toe 23 rests. Manipulating the cap 46 will permit adjustment of the vernier support lengthwise of the rule.

The integral parts 14, 20, and 21 swing in an arc about the standard 30 by provision of the apertured ears 49 through which the pointed standard extends which marks an axis in vertical alinement with the axis of the threaded end 31, so that swinging of the outer end of the rule 15 will be guided by mounting of the lower ear 49 about the standard 30 whose point 35 is closely adjacent a lower edge of the rule 15 and on the same side thereof as the foot piece 14.

As to details of construction made use of as illustrated, the vernier arc 16 is provided with an inner edge having an extended lower tongue 50 in cross section, which fits neatly beneath an over-extended tongue 51 on the outer edge of the protractor 10, the tongue 51 being continuous about the protractor 10, whereby the upper surfaces of the vernier 16 and said protractor 10 are retained in substantially even level, so that the main arm 13 of the vernier is divided at its outer end into arms 52 extending over the protractor and the ends of the vernier arc, to which these arms are detachably secured by screws 53, the latter extending down through the supporting plate 17 as well.

Operation: Our improved instrument is assembled by first inserting the plain end of the rod 12 in the cross opening of the enlargement 27 and securing the screw 28 down upon the rod. The standard 30 is now fixed in the opening 34 of the base 32, and its lower portion 30 inserted in the apertured ears 49 of the foot 14. The protractor is now applied upon the base 32, the arm 13 mounted upon the flange 38, and the spring nut 40 screwed down against the arm 13. The vernier arc 16 is now applied in contact with the edge of the protractor with the tongues 50 and 51 in registration, and the ends of the arc beneath the arms 52, and the plate 17 beneath the vernier 16, when the screws 53 will fasten the parts together vertically.

The end 20 of the arm 21 is now inserted in the yoke 18, so that rotation of the foot 14 about the standard 30 will move the vernier 16 correspondingly about the pratractor and is tightened down upon the parts 13 and 10 by the clamping screw 40. The annulus 42 having a smooth axial opening, is now applied loosely upon the threaded end 31, the eye 29 of the rod 12 applied upon the end 31, and the nut 44 threaded down upon the eye.

By the assemblage of the ends of the rod 12 upon the standards 26 and 30 as explained above, and the pivoting of the ears 49 upon the standard 30 as illustrated, the parts 13 and 14 are concentrically pivoted about the same vertical axis, and swinging the foot 14 and its associated parts will evidently swing the vernier 16 in cooperative movement. The toe portions 23 and 48 may now be readily mounted upon the rule 15 by inserting such toes in the lateral grooves 22, and the parts mounted in suitable relation by tightening the screw 25 against the force of the spring 45, by actuating the head piece 46 manually.

By the described mounting of the standard 30 and its attached parts upon the scale 15, the swinging of the scale about the standard 30, will be registered in numbers on the arc 16 relative to the protractor 10. The protractor 10 may well be clamped down upon the flange 38 by actuation of the nut 44, and still permit the swinging of the vernier with its supporting scale 15 together, to the desired angle with a line upon which the point 35 may be stationed, the exact angle being shown in the reading of the vernier. It is especially of importance that when the point 35 is on the transit point, and the scale 15 coincides with the due north line while the zero of the protractor coincides with the zero of the vernier, upon releasing the nut 40 the scale 15 may be swung about point 35, and readings of both angle and distance may be laid off simultaneously from this transit point. The raised position of the connecting rod 12 and the relatively heavy base 11 of the standard 26, serve to make convenient such calculations and ready laying off of the lines desired.

Evidently the scale 15 for supporting the vernier need not be triangular, as we have illustrated in the drawings, but that any suitable elongated member having proper attaching grooves 22, may be utilized, and such modifications are contemplated.

While this specification sets forth in detail the present and preferred construction of the mechanism, still in practice such deviations from such detail may be resorted to as do not form a departure from the spirit of the invention as defined in the appended claims.

Having thus described our invention what we claim as new and useful and desire to secure by Letters Patent is:—

1. In a topographic mechanism, the combination of vertical standards one of which has a lower pointed end for engaging a drafting board, a connecting rod detachably spacing the upper ends of said standards, a protractor having an apertured cross member for receiving the pointed standard to be supported thereby, a vernier arc swinging about the periphery of said protractor, and means for pivotally supporting the vernier for movement adjacent the edge of the protractor and in a horizontal plane about the pointed standard upon said board, so that swinging movement of the support means on the board will correspondingly move the vernier about the protractor.

2. In a topographic mechanism, the combination of a pointed supporting standard for engaging a drafting board, a rod having at one end an eye for engaging the upper end of said standard and means for supporting the opposite end of the rod, a protractor centrally mounted upon the standard beneath the said eye, a vernier arc swinging contiguously about said protractor, an elongated scale adapted for mounting on said board, and means for pivotally supporting said standard in vertical position, and the scale for swinging movement about the standard and in connection with said vernier arc, so that swinging movement of the scale will correspondingly move the vernier about the protractor.

3. In a topographic mechanism, the combination of spaced vertical standards, a rod detachably connecting the upper ends of said standards, one of the standards having a lower pointed end for engaging a drafting board and one of the standards having a lower member for supporting the same concentric with the pointed standard, a vernier arc swinging contiguously about said protractor, upon a radial arm having an end held concentric with the protractor, an elongated, supporting, grooved rule, and mounting means for the vernier member having one portion for detachably engaging the grooves of said rule and another portion for pivotally engaging the said pointed standard, so that swinging movement of the rule in a horizontal plane will be indicated on the protractor by the scale of the vernier.

4. In a topographic mechanism, the combination of spaced vertical standards, a rod detachably connecting the upper ends of said standards and one of the standards having a lower pointed end for engaging a drafting board, a protractor having an apertured cross member for receiving the pointed standard to be supported thereby, the upper end of one of the standards having a threaded portion provided with a nut for detachably securing one end of said rod in secured position thereon, a vernier arc swinging contiguously about said protractor, upon a radial arm having an end held concentric with the protractor, an elongated, supporting, grooved rule, and mounting means for the vernier member having one portion for detachably engaging the grooves of said rule and another portion for pivotally engaging the said pointed standard, so that swinging movement of the rule in a horizontal plane will be indicated on the protractor by the scale of the vernier.

5. In a topographic mechanism, the combination of two vertical standards, a rod adjustably connecting said standards, and one of the standards having a lower pointed end for engaging a drafting board and an upper threaded end for connection with one end of said rod, a protractor having a cross member apertured to receive therein the said threaded end, a vernier arc swinging about said protractor upon a radial arm having an apertured end concentric with and above the protractor, a vertically-extending supporting plate loosely rotated about the pointed standard, the said vertical plate and vernier having cooperating means for connection whereby the swinging of the support member will rotate the vernier therewith, and an enlongated rule having longitudinal grooves thereon, the foot of the support member being mounted in said grooves so that movement of the rule upon the board will be indicated on the protractor by the scale of the vernier.

6. In a topographic mechanism, the combination of two spaced, vertical standards adjustably connected and one of them having a lower pointed end for resting upon a drafting board and an upper threaded end, a protractor having a cross bar apertured for supporting upon the pointed standard, a vernier arc mounted upon one end of a radial arm, the latter having an apertured end rotatably fitting axially upon the said protractor, a yoke member secured upon the lower surface of said vernier arc, and a vertical, supporting plate having apertured extensions rotatably mounted about the pointed standard beneath the protractor and having a radial arm provided with an upper extension for fitting within the said open yoke, whereby the swinging of the support plate will rotate the vernier relative to the periphery of the protractor, the foot of said supporting plate having means for mounting upon an elongated element whose angular movement upon the board will be indicated on the protractor by the scale of the vernier.

7. In a topographical mechanism, the combination of two vertical standards a rod adjustably connecting said standards, and one of the standards having a lower pointed end for resting upon a drafting board and an upper threaded end, a protractor having a cross bar apertured for supporting upon the pointed standard, the said protractor having an upturned flange about the central aperture thereof in the form of a sleeve, an arm, a vernier arc mounted upon one end and cooperating with said protractor, said arm having an apertured end pivoted above the said protractor and about the said flange and extending radially of the protractor, a yoke member secured upon the lower surface of said vernier arc, and a vertical supporting plate having apertured extensions receiving said pointed standard beneath the protractor and having a radial arm provided with an upward extension for fitting within the said open yoke, whereby the swinging of the supporting plate will rotate the vernier about the periphery of the protractor, the foot of said supporting plate having means for attachment to an elongated element whose angular movement upon the board will be indicated on the protractor by the scale of the vernier.

8. In a topographic mechanism, the combination of spaced vertical standards having their upper ends detachably connected by a rod and one of the standards having a lower pointed end for engaging a drafting board, a protractor having a centrally apertured cross member for supporting the said protractor concentric with the pointed standard, a vernier arc swinging about said protractor upon a radial arm having an end held concentric with the protractor, an elongated grooved rule and means for mounting the vernier member upon said rule and engaging the said grooves detachably, so that swinging the rule in a horizontal plane will correspondingly move the vernier about the protractor.

In witness whereof we have hereunto set our hands this 7th day of May, A. D. 1928.

ERNEST L. MINER.
CLARENCE M. LEATHERMAN.